(No Model.)

C. H. TALMAGE.
SYSTEM OF ELECTRICAL DISTRIBUTION.

No. 513,839.  3 Sheets—Sheet 1.

Patented Jan. 30, 1894.

WITNESSES:
Julian Laughlin
D. M. Hull

INVENTOR
Charles H. Talmage
BY
H. M. Plaisted
HIS ATTORNEY.

(No Model.)

C. H. TALMAGE.
SYSTEM OF ELECTRICAL DISTRIBUTION.

No. 513,839. Patented Jan. 30, 1894.

WITNESSES:
Julian Laughlin
D. M. Hull

INVENTOR
Chas. H. Talmage
BY
H. M. Paisted
HIS ATTORNEY.

(No Model.)
C. H. TALMAGE.
SYSTEM OF ELECTRICAL DISTRIBUTION.
No. 513,839. Patented Jan. 30, 1894.
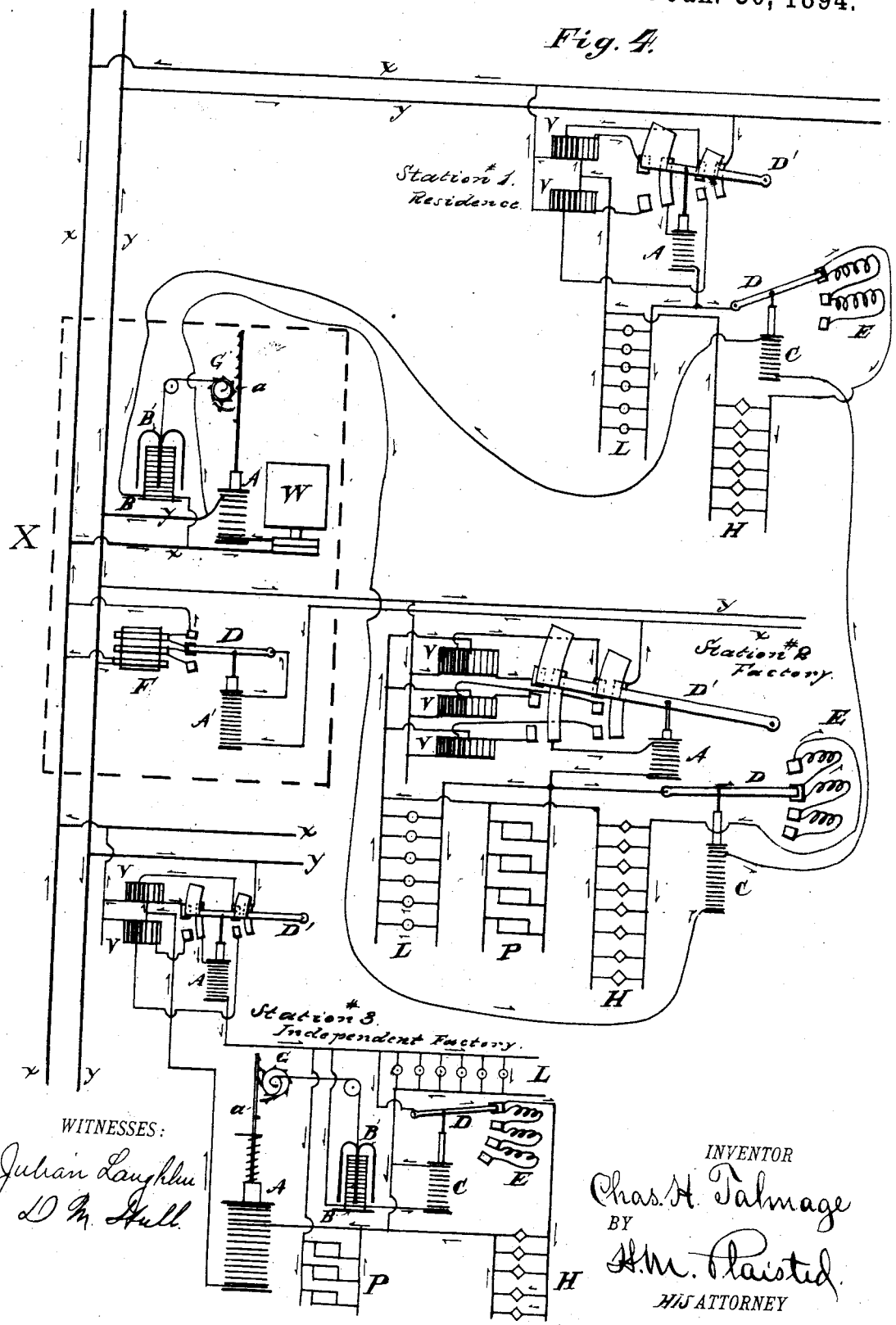

UNITED STATES PATENT OFFICE.

CHARLES H. TALMAGE, OF ST. LOUIS, MISSOURI.

SYSTEM OF ELECTRICAL DISTRIBUTION.

SPECIFICATION forming part of Letters Patent No. 513,839, dated January 30, 1894.

Application filed March 31, 1893. Serial No. 468,445. (No model.)

*To all whom it may concern:*

Be it known that I, CHARLES H. TALMAGE, a citizen of the United States, residing in the city of St. Louis and State of Missouri, have invented certain new and useful Improvements in Electric-Controlling Devices, of which the following is a specification, reference being had therein to the accompanying drawings.

My invention relates to certain new and useful improvements in electric controlling devices.

The objects of my improvements are to provide means for regulating automatically the quantity of electricity supplied to electrically operated or translating devices, such as heaters, lights, and power appliances; to diminish temporarily the supply to one,—the heaters, for instance,—when the supply is not sufficient for all, and thus run the others to full capacity, whereby the converter or converters are maintained in full operation, and waste of electricity by their being only partially loaded at times, is prevented; also successively to cut out or cut in automatically such one or more converters as the requirements of the users demand; and to provide a system of such automatically operated controlling devices adapted to the varying quantities of electricity required, or to the amount of power, light and heat called for in different localities electrically connected.

With these objects in view my improvements have reference to an electro-magnet and a switch automatically operated thereby; have reference to a peculiar form of solenoid, acting as a counter-electro motive force device and operative connections between the same and an electro-magnet (or ampère meter), whereby the former is operated when a predetermined amount of current is reached, and tends to maintain the said current constant; have reference to a system of converters provided with such automatic regulators, and to a system of other electrical appliances operating with such converters, provided with automatic controlling devices such as hereinafter described and illustrated in this exemplification of my invention.

Figures 1, 2:
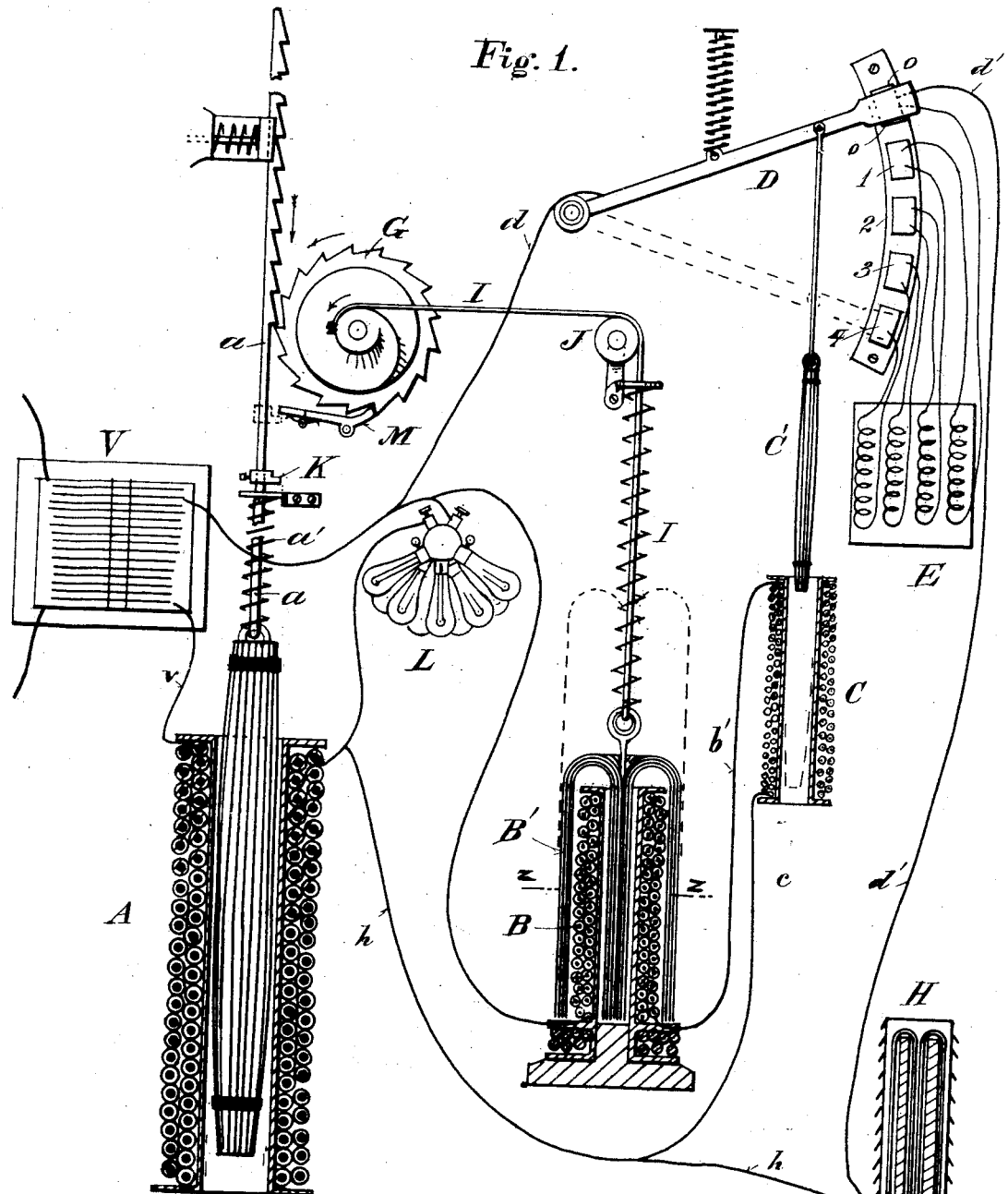
Figure 1A:
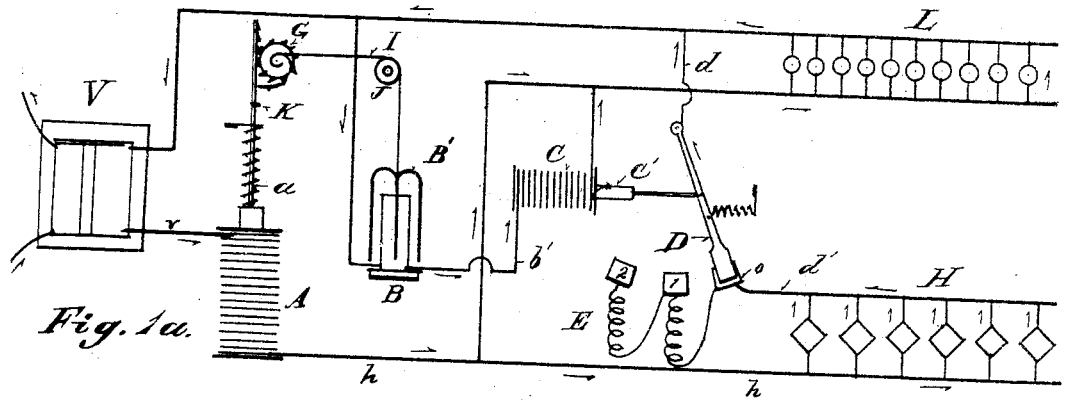
Figure 3:
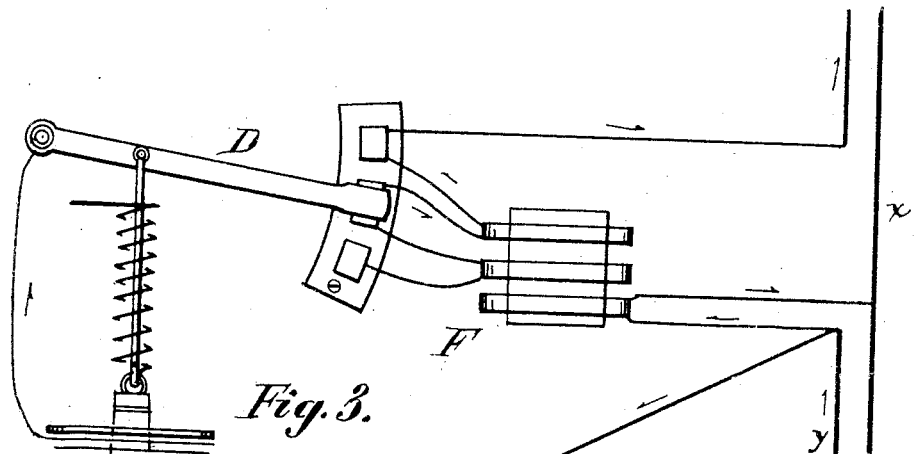

In the accompanying drawings on which like reference letters and numerals indicate corresponding parts, Figure 1. represents a diagrammatic view of one arrangement of my device with details in section; Fig. 1ª, a diagrammatic view of the devices shown in Fig. 1, and their electrical connections; Fig. 2. a detail cross section of my particular form of controlling solenoid, on $z$—$z$, Fig. 1; Fig. 3. an electromagnet and switch arranged to automatically increase an electric current; Fig. 4, an illustrative diagram of my system of electric controlling devices and their connections; and Fig. 5. an electro-magnet switch, and a bank of converters controlled thereby.

In the use of electricity for power, lighting, &c., the full capacity of the plant is not often needed for more than one or two hours out of the twenty-four. The converters therefore run mainly less than their full capacity, but full capacity is the condition in which they operate with their best efficiency and with the least relative waste of current. It is estimated that from three per cent. to five per cent. is lost when the converters are operating on a light load. It is one of my chief objects to so connect and regulate automatically, a number of electrical devices, as to maintain nearly, or quite the full load on the converter continually, thereby preventing this waste and increasing the efficiency of the plant. For example, I take a converter supplying current for light and power, or either, and use it to run electric heaters, without a corresponding increase of the capacity of the plant, as will now be explained.

Referring to the drawings, the letter A, represents an electro-magnet or solenoid in circuit with converter V adapted to be connected to a dynamo or other suitable source of electricity, preferably one supplying an alternating current for lamps L or other appliances. A heater H is also supplied from the same converter, and the current to the heaters in this case is regulated automatically by a switch D operated through interconnecting mechanism, by the electro-magnet A. This switch D Fig. 1, is electrically connected to the converter and the heater through the wires $h$ and $v$ and the electromagnet. When the switch arm or other movable piece is on the contact pieces $o$, Fig. 1 the circuit is direct to the heater, but the pressure is lessened more and more, as the arm is brought down on the insulated contact pieces 1, 2, 3, &c., which send the current through a rheostat or other suitable adjustable resistance. Indicated at E. A spring or other means, affects the return of the arm to piece o when freed from the controlling means connecting it with the electro-magnet.

The plunger of the electro-magnet is provided with a stem $a$ to operate a ratchet wheel G, having a winding drum preferably of spiral, or other eccentric winding surface, for a cord I passing over a guiding pulley J to the armature or plunger B' of the coil B. The eccentric drum gives leverage in starting the armature plunger B'. This solenoid coil consists of a circularly wound hollow cylinder of preferably insulated wire, electrically connected. A base ring of larger diameter having an insulating flange above it, increases the desired effect. The plunger consists of a series of inverted U-shaped wires, one leg of each wire forming part of a central core, and the other legs forming an outer inclosing cylinder, as shown in Fig. 2. This plunger core enters the coil B, while the outer legs surround the coil, thus nearly completing the magnetic circuit of the solenoid, as shown in Fig. 1. When the plunger is in the latter position the current flowing through the devices is practically nil. It is increased, for a purpose presently to appear, as the plunger B' is separated from the insulating flange, thus increasing the gap and decreasing the self-inductive resistance. A strong reactive tendency is thus secured when the plunger is down and a current passes through the wire $b'$ to the member B. This constitutes the counter-electro motive force device.

A controlled solenoid C consists of a spirally wound hollow cylinder, connected with the counterelectro motive force device, and the source of electricity, by wires $b'$, and $c$, respectively, and their connections. A plunger C' adapted to enter the cylinder, has a stem connected to the switch D, and held up with the switch by a spring as shown, or otherwise. The plunger B' of the counterelectro motive force device is normally lowered when little or no current is acting, and the insulating flange between the base ring and the outer legs, prevents excessive contact and difficult separation of the members. By raising the major plunger B' the minor plunger C' is drawn downward, and with it the switch arm, thus cutting off more or less of the current to the heater. This action may be begun when the electro-magnet A is delivering (say) ninety-five per cent. of the capacity of the source of electricity as shown and the entering plunger then brings the lower teeth on its stem into engagement with the ratchet drum, thus winding up the major plunger cord I. By the time the electro-magnet core has loaded the electro-magnet to one hundred per cent. or somewhat over, the counter electro motive force device will have caused the solenoid to throw the switch so as to cut off part or all of the current from the heater, and send it into the lamps, (or the power). When the current lessens by turning out more or less of the lights, or from any other cause, the electro-magnet core will be withdrawn by its supporting spring $a'$, and bring an adjustable trip K, in contact with a safety pawl M, engaged with the ratchet, to free the latter and allow the return of the plunger B', to turn on the current to the heater again. The pawl is hinged to allow the trip to pass down without actuating it, and it normally engages with the ratchet. A certain distance for clearance or play is left between the trip and the pawl as shown in Fig. 1. Thus it will be seen that the heater will draw upon the electro-magnet to maintain the converter at or near its full capacity, and consequent best efficiency, but the counterelectro motive force device, forming a controlling device change, will shut off the current from the heater more or less, according as it is required for lighting or other purpose. I lay claim broadly to this controlling device, and do not confine myself to the exact form of interconnections from the electro-magnet to the switch, and may arrange such connections more or less directly, as the circumstances may require. Neither do I confine myself to an electrically-operated switch for diminishing the current merely, but may apply it to increase the pressure of the current and form what is ordinarily called a "booster," as shown in Fig. 3, at F. I may also employ such a booster in combination with the previously described reducer switch of Fig. 1, and in Figs. 4 and 5, I have indicated such a combination and arrangement of electrical appliances and controlling devices, as serve to exemplify my system.

Figure 5:
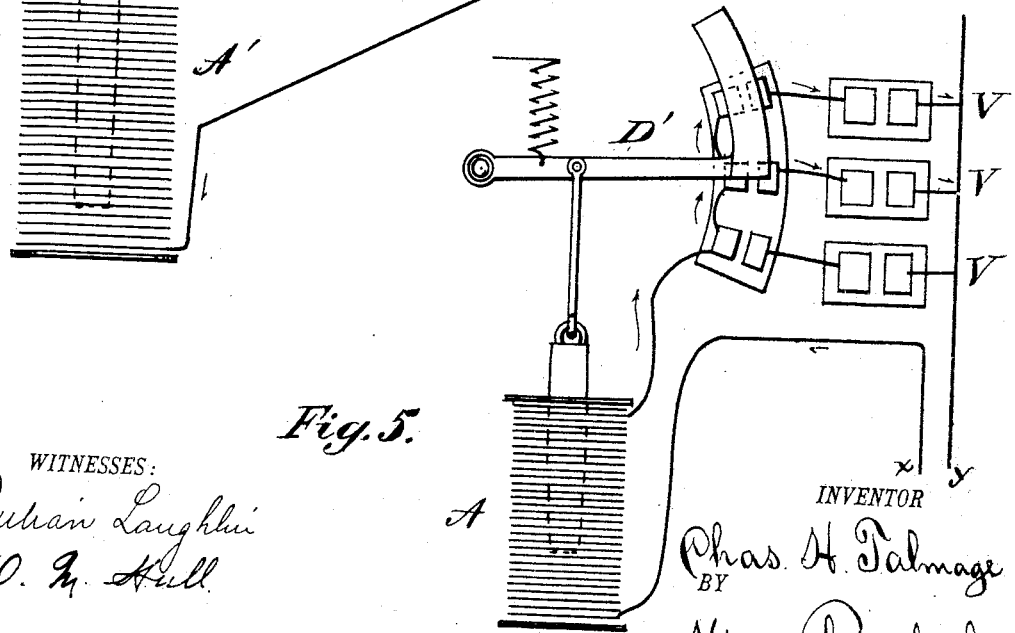

A power house X, has a dynamo W or other generator of electricity, and the letters $x$, $y$, designate the main and branch line wires, from the electro-magnet A'' at the power house to the converters, or banks of converters, V, at the factories or houses of consumers, requiring power, heat and light in more or less quantities. Each converter (or bank) is provided with its respective electro-magnet and switch A and D', respectively, in the path of the main line, as shown in Fig. 5, in order to maintain such converters fully loaded. I also provide a minor solenoid, switch and rheostat, C, D, and E, respectively, for the heaters at that place, operated through an auxiliary circuit from a counterelectro motive force device B at the power house.

Station No. 1 at the top of Fig. 4, may represent a residence station where light and heat are used. Only one of the two converters is shown in operation, the current being indicated by the arrows. When the switch D' is drawn down by the electro-magnet A it will bring in the second converter which is now shown cut out. The heaters H are receiving their full amount of electricity through the switch D; the solenoid C is governed from the central controller at the power house through the auxiliary line.

Station No. 2 represents a factory station provided with three converters in a bank and an electrically controlled switch therefor. Here we have light, power and heat appliances, with the switch of the minor solenoid C in circuit with the rheostat and heater, in order to regulate the latter. The solenoid in the factory station No. 2 is in circuit with the solenoid C of the residence station No. 1, and is wired to a source of electricity as indicated by the auxiliary line through which the counterelectro motive force device B governs these outlying solenoids.

During the day the heaters keep the converters loaded in the residence portion and also maintain the maximum pressure, or nearly so, in the factory district. In the latter part of a winter day, say from five to six p. m., the lights in the factories will be turned on, and in more or less of the residences. This would require the full capacity of the plant, and the heaters would be temporarily shut off by the automatic controlling device, C, D, E, before described which are at each sub-station, and are controlled from the main station or other convenient point, by the counterelectro motive force device, and the electro-magnet A. After six p. m., when the power is not running in the factories, the heaters would again be turned on automatically. Again, if the pressure falls in any part of the main line, as in the middle part of Fig, 4, the electrically operated switch and bolster, A' D F, Fig. 3, will send the extra amount of current gained by cutting off from the heaters of the upper lines, into the lower line, and restore the balance.

In case some large factory should require to be independent and use its own power, light and heat, as at station No. 3, it can be supplied with a complete outfit, including a counterelectro motive force device and cut down its own heat when its power or light requires the full capacity of its converters V. This station would thus correspond to Fig. 1 and Fig. 1ª in its arrangement.

Referring to Fig. 5, a bank of converters is shown together with the electrically-operated switch D' for said converters. The current from the main line passes through the electro-magnet and cuts in one converter after another according to the amount of current. In this figure the switch is shown in position to send the current through two converters; a larger current, bringing it down to the next pair of buttons or contact pieces, would cut in the third converter while maintaining the other two also in action and so on, successively. When a light load is on, only one of the converters in the bank may be in operation, the others being cut out.

Having thus fully described my invention, what I claim as new, and desire to secure by Letters Patent, is—

1. The combination with a generator, of an electro-magnet or solenoid directly wired thereto so as to receive the full current, two translating devices in parallel with regard to each other, one side of each device being fed directly from the generator, and the other side fed independently from said generator after passing through the said electro-magnet or solenoid, a switch and rheostat in series connection with one of said devices, and interconnecting means between said switch and electro-magnet or solenoid, substantially as shown and described.

2. The combination with an electro-magnet or solenoid located in the main circuit with a source of electricity, of a switch, and operating connections between said switch and said electro-magnet, or solenoid a rheostat adapted to operate with said switch, a heater wired to said switch and rheostat, and a lamp in parallel circuit with said heater and fed from said electro-magnet or solenoid, substantially as and for the purpose described.

3. The combination with an electro-magnet electrically connected with a source of electricity, of a switch, a solenoid having a plunger operatively connected to said switch, a counterelectro motive force device interposed between said solenoid and source of electricity and wired to both, and operating connections between said electro-magnet and said counterelectro motive force device, whereby the switch is moved according to a predetermined current passing through said electro-magnet.

4. The combination with two sets of translating devices connected in parallel with one another, of an electro-magnet in the main circuit and having a movable core, an electric switch in the circuit of one of said sets, a solenoid having a plunger operatively connected to said switch, a counterelectro motive force device interposed between said solenoid and a source of electricity and wired to both, intermediate connecting mechanism between said counterelectro motive force device and the core of said electro-magnet, and a rheostat adapted to be connected in series with one of said sets of translating devices by the operation of said switch.

5. The combination with an electro-magnet or solenoid having a movable core, of a counterelectro motive force device having a plunger and wired to a source of electricity, a ratchet connection with said plunger from the core of said electro-magnet, a solenoid wired to said counterelectro motive force device and said source of electricity and having a plunger, and adjunctive devices adapted to be operated by said solenoid-plunger, according to the current passing through said electro-magnet.

6. The combination with a generator and an electro-magnet wired thereto and having a movable core, of a counterelectro motive force device wired to said generator and adjunctive devices electrically controlled by said counterelectro motive force device, a ratchet stem for the core of said electro-magnet, a ratchet wheel adapted to be engaged thereby and provided with a winding drum or surface, and a flexible connection from said winding drum or surface to said counterelectro motive force device, to operate the latter, and thus control the adjunctive devices according to the current passing through the electro-magnet.

7. The combination with a solenoid having a plunger and adjunctive devices operatively connected thereto, of a counterlectro motive force device consisting of a circularly wound hollow cylinder wired to said solenoid and to a source of electricity, and a core consisting of inverted U-shaped wires, the inner legs of the wires forming a part of a central portion adapted to be inclosed by the hollow cylinder.

8. A solenoid provided with a plunger, and consisting respectively of a circularly wound hollow cylinder having electrical connections, and a plunger formed of inverted U-shaped wires, the inner leg of each wire forming part of a central core adapted to enter said cylinder, and the outer legs forming an inclosing shield about said cylinder, and means to withdraw said plunger from its matching cylinder.

9. A solenoid consisting of a circularly wound hollow cylinder having a base ring or flange of larger diameter and adapted to serve as an armature, and a plunger consisting of an inverted, double U-shaped set of wires concentrically arranged so as both to enter and inclose the said cylinder.

10. In a system of electrical regulation, the combination with a main generator at a central station, and a series of secondary generators located at sub-stations, and connected in parallel with one another on the main line from said main generator, of an electro-magnet in circuit with the main line, a main controlling device operated by said electro-magnet, a controlling device at some or all of said sub-stations to regulate the respective converters, and electrical connections between said main controlling device and those at the sub-stations, to effect automatic regulation of the converters from the central station.

11. In a system of electrical distribution, the combination with a main generator at a central station, and sub generators located at sub-stations and connected with the main generator, of an electro-magnet in circuit with the main line, a counterelectro motive force device operated by said electro-magnet, a solenoid at some or all of said sub-stations and wired to said counterelectro motive force device and to a source of electricity, a switch and rheostat operated by each of said solenoids, two or more sets of translating devices located at said sub-stations and fed independently from said sub-generators, and one of said sets in series with the switch and rheostat, substantially as and for the purpose described.

12. In a system of electrical distribution, the combination with a generator, line wires led therefrom, of an automatic booster at one portion of the line consisting of a primary coil fed from the line wires, one or more secondary coils, a set of switch buttons in series with the secondary coil or coils and a solenoid-operated switch arm in series with the line wires, substantially as shown and described.

13. A system of electrical distribution, consisting of a main converter or generator, a main electro-magnet in circuit therewith, a series of main and branch line wires, a number of converters or other generators located on said line wires, and two or more sets of translating devices run by said converters or generators respectively, electrical controlling devices for each converter, a main controlling device at the main station and electrically connected to the outlying controlling devices, and an electrically controlled booster for the portion of said line wires to increase the pressure in that portion, substantially as described.

14. In a system of electrical distribution, a main generator, sub-generators, a set of lighting appliances, and a set of heating appliances, and controlling devices for one of said sets consisting of a solenoid-controlled switch and rheostat, adapted to regulate the current to its corresponding heating appliance, a counterelectro motive force device in series with a number of said switch solenoids, electrical connections between each converter and said sets of lighting and heating appliances, and between the main and sub-generators, substantially as described.

15. The combination with a solenoid-plunger having a ratchet-toothed stem, and a ratchet wheel operating therewith, of a detent pawl for said ratchet wheel, and an adjustable trip carried by said plunger stem, to disengage said pawl, and adjunctive devices operating therewith.

16. The combination with a solenoid-plunger having a ratchet-toothed stem, and a ratchet wheel adapted to be engaged therewith and having eccentric or other winding surfaces, of a solenoid and plunger therefor, a connection from said winding surfaces to said solenoid-plunger, a safety pawl normally engaging with said ratchet wheel, and an adjustable trip carried by said plunger stem and adapted to operate the said safety pawl in one direction only, substantially as described.

17. In a system of electrical appliances, the combination with a main generator and line wires therefrom, of a bank of converters, the primary coils of which are connected in parallel to said line wires, translating devices connected in parallel to the secondary coils of said converters, an electro-magnet or solenoid in series with said translating devices and said secondary coils, a switch device consisting of a movable piece operatively connected to said electro-magnet and having a double plate-portion and a corresponding double set of contact pieces electrically connected to the primary coils and the secondary coils respectively, substantially as shown and described.

18. In a system of electrical appliances, the combination with a main generator and line wires therefrom, of a bank of converters, the primary coils of which are connected in parallel to said line wires, two or more translating devices connected in parallel to the secondary coil of said converter, an electro-magnet or solenoid in series with said translating devices and said secondary coils, a switch device consisting of a movable piece operatively connected to said electro-magnet and having a double plate-portion and a corresponding double set of contact pieces electrically connected to the primary coils and the secondary coils respectively, and a controlling device in series with one of said translating devices, substantially as shown and described.

19. In a system of electrical appliances, the combination with a main generator and line wires therefrom, of a bank of converters the primary coils of which are connected in parallel to said line wires, translating devices connected in parallel to the secondary coils of said converter, an electro-magnet or solenoid in series with said translating devices and said secondary coils, a switch device consisting of a movable piece operatively connected to said electro-magnet and having a double plate-portion and a corresponding double set of contact pieces electrically connected to the primary coils and the secondary coils respectively, a switch and rheostat in serial circuit with one of said translating devices, an electro-magnet or solenoid operatively connected to said switch, and a counterelectro motive force device wired to said electro-magnet or solenoid and said generator, substantially as shown and described.

20. In a system of electrical appliances, the combination with a bank of converters or other generators, each connected in parallel with the main line, and an electro-magnet connected to said main line, of a switch operatively connected to said electro-magnet and provided with a duplicate set of contact pieces or buttons, one set being connected together and in circuit with the electro-magnet, and the other set being independent and each electrically connected with its respective converter, whereby one or more of said converters may be cut in or out, according to the position of the switch arm on said contact pieces or buttons.

In testimony whereof I affix my signature in presence of two witnesses.

CHARLES H. TALMAGE.

Witnesses:
H. M. PLAISTED,
D. M. HULL.